United States Patent

[11] 3,623,812

[72] Inventors: Kurt Hannig, Krailling; Hanns Wirth, Hohenpeissenberg, both of Germany
[21] Appl. No.: 863,520
[22] Filed: Oct. 3, 1969
[45] Patented: Nov. 30, 1971
[73] Assignee: Max-Planck-Gesellschaft zur Forderung der Wissenschaften e.V. Gottingen, Germany
[32] Priority: Oct. 3, 1968
[33] Germany
[31] P 18 00 993.3

[54] METHOD FOR THE AUTOMATED ELECTRONIC DENSITOMETRIC EVALUATION OF SEPARATED MATERIAL MIXTURES, USING CARRIERLESS ELECTROPHORESIS
11 Claims, 1 Drawing Fig.

[52] U.S. Cl. .................................................. 356/105, 250/219 FR, 356/203
[51] Int. Cl. ................................................ B01k 5/00, G01n 21/30

[50] Field of Search ........................................ 356/105, 203; 250/219 FR

[56] References Cited
UNITED STATES PATENTS
2,467,057  4/1949  Simmon .................. 356/203
3,342,997  9/1967  Taylor et al. ............. 356/105

Primary Examiner—Ronald L. Wibert
Assistant Examiner—Orville B. Chew, II
Attorney—Christen & Sabol ABSTRACT: The present invention relates to a method for the automated electronic densitometric evaluation of separated material mixtures, using carrierless electrophoresis, in which the distribution pattern of the light-absorbing or -reflecting mixture components, for example in the form of an enlarged or reduced optical image, is scanned in accordance with the flying point principle, the scanned points are converted into current pulses and the current pulses belonging to the scanned line are integrated.

Throughout the specification, reference is made to a "-Vidicon" tube as an element in the apparatus and process of the present invention. This term is utilized to indicate conventional and well-known electronic television recording tubes.

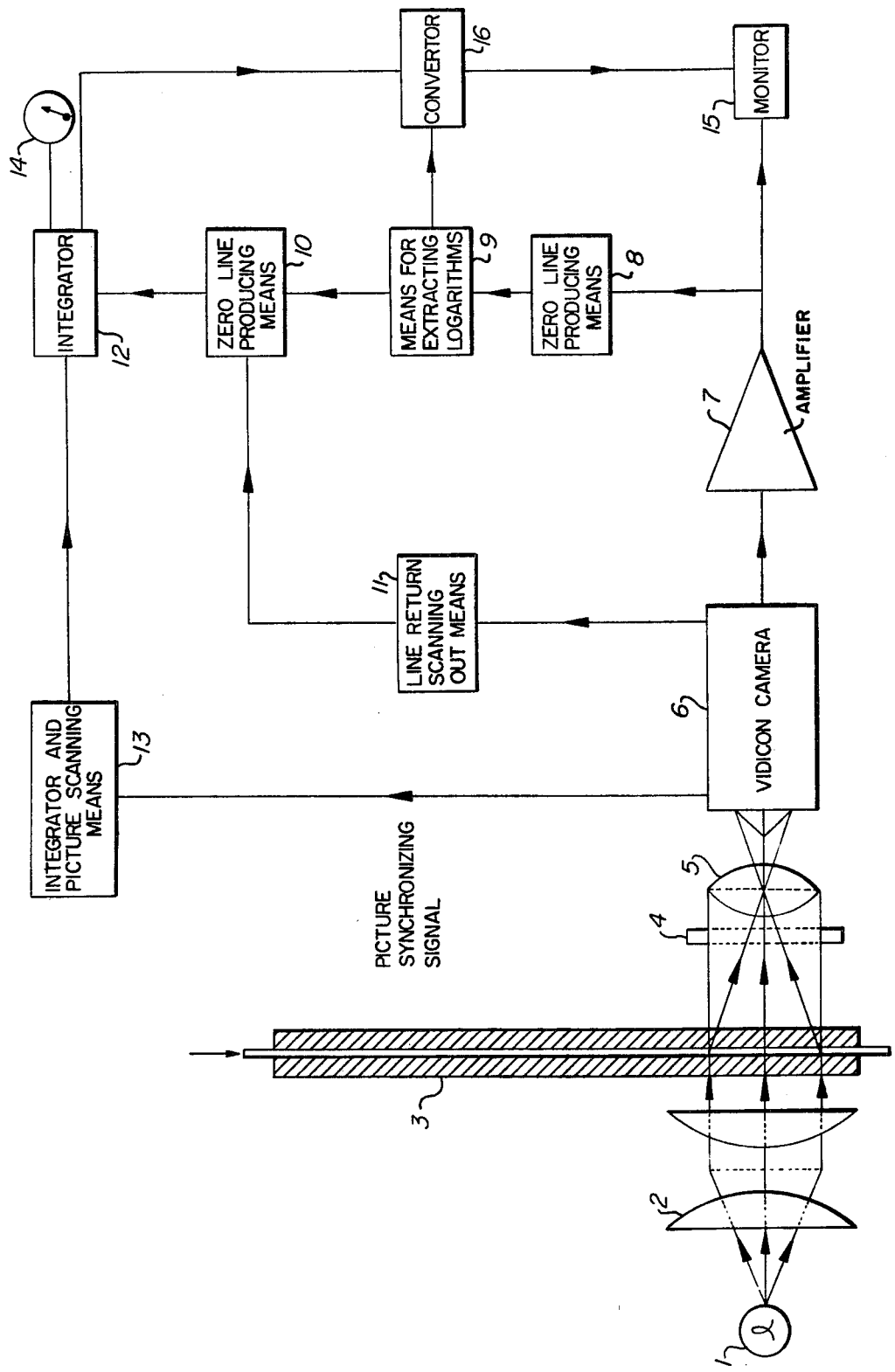

METHOD FOR THE AUTOMATED ELECTRONIC DENSITOMETRIC EVALUATION OF SEPARATED MATERIAL MIXTURES, USING CARRIERLESS ELECTROPHORESIS

In accordance with a previous proposal, electropherograms, i.e. generally colored segregation representations produced by the separation of mixtures of materials using electric fields, were illuminated through a slot which was moved over the segregation image. The intensity of the emerging light was then evaluated optically with a photocell. Such previously proposed methods, however, have the disadvantage that in the case of uneven distribution, coloration or limitation of the individual components, an erroneous extinction value is obtained.

In accordance with a further previously proposed method an electropherogram was scanned line by line with the help of a light spot from the screen of a cathode ray tube and in this manner the course of the extinction was determined along the line length. The position of the lines corresponds in this arrangement with that of the conventional slot. The disadvantage of this known method is that the diameter of the light spot and its diffusion in the carrier layer or base of the electropherogram to be evaluated impairs the resolution capacity of the system and errors arise in the computation of the mean value of the extinction. There is furthermore the disadvantage that the spectral extent of the luminous spot is very narrow so that for purposes of evaluation only a very limited wavelength range is available.

In accordance with a still further proposal, distribution patterns of mixture components present on carrier materials were projected on the screen of a Vidicon tube and the resistance image formed on the Vidicon screen was analyzed in accordance with the flying point principle using a cathode ray.

With the help of such methods the evaluation of electropherograms can be carried out using light of any wavelengths, there being the possibility of magnifying or reducing the distribution pattern with optimum resolution relationship. However, there is the disadvantage that the carrier materials used for producing the electropherograms to be evaluated have a relatively poor optical quality, the electrophoretic separation requires numerous process steps, and in some cases the reproducibility leaves much to be desired.

One object of the invention is to provide a method which makes possible the automated evaluation, for example on a microscale, of separations of material mixtures carried out on the principle of continuous basefree electrophoresis. A further object of the invention is to provide such a method which while providing a highly satisfactory resolution can be carried out over any desired range of the spectrum.

In accordance with one aspect of the present invention there is provided a method for the automated electronic densitometric evaluation of separated material mixtures, using carrierless electrophoresis, in which the distribution pattern of the light-absorbing or reflecting mixture components, for example in the form of an enlarged or reduced optical image, is scanned in accordance with the flying point principle, the scanned points are converted into current pulses and the current pulses belonging to the scanned line are integrated, the method being characterized in that the section of the electrophoresis separation chamber, with the separated mixture component, is examined with light which may or may not pass through the chamber, to produce a distribution pattern which with the help of an optical system is projected as an image on the screen of a Vidicon tube, the screen of the Vidicon tube carrying the resistance image is scanned line by line by a cathode ray, the electric signal obtained, which represents the degree of transmission, is amplified with the help of an AC amplifier, after the formation of the zero line for the degree of transmission the logarithm of the amplified electric signal is derived, the phase of the logarithmic signal so obtained is reversed and the zero line of the extinction coefficient is formed, the voltage obtained in this manner is integrated after scanning out the line return voltage and the integrated voltage obtained is measured using a peak voltage measuring means.

For carrying out this method of the invention, the separation chamber section which contains the separated mixture components in the form of a distribution pattern is examined optically with light which may or may not pass therethrough, in accordance with a conventional carrierless electrophoresis apparatus such as described in British Pat. No. 1,098,307, the examination being as even as possible and making use of monochromatic light of a wavelength corresponding to the absorption maximum or reflection minimum of the component mixture. The separating chambers used for separating the material mixture can be as large or as small as may be desired, since the distribution pattern obtained by shining light through the material can be enlarged or reduced in size optically and displayed on the screen of a Vidicon tube. An advantage of particularly small separation chambers is that separation can be carried out rapidly on a microscale.

The distribution pattern displayed on the screen of the Vidicon tube can be scanned in a conventional manner in accordance with established television standards. In this manner an electric signal is produced which can be processed further by the computer amplifier. Since with the help of modern integrated circuits amplifiers with a band breadth of a few megacycles can be constructed, it is possible, despite the very rapid scanning (20 msec. for the whole image), to derive the logarithm of these signals without loss of information, i.e. loss of resolution, and to integrate the signals.

The invention will now be described with reference to the accompanying drawing in more detail. The single FIGURE of drawing shows diagrammatically the performance of the preferred embodiment of the invention.

In the embodiment of the invention shown in the drawing the light from a light source 1, after passing through a condenser 2 to produce a homogenous beam, and possibly through an opal glass plate, not shown, is projected onto the distribution pattern, which is to be investigated, in the separation chamber 3. As a light source it is possible to use conventional lamps with a high density of rotation in the required spectral region, for example mercury high-pressure lamps for the visible range, deuterium lamps for the near ultraviolet range and tungsten strip lamps for the near infrared range.

The distribution pattern represented by the transmitted light is projected with the help of an optical system 5, for example a zoom lens device, onto the screen of a Vidicon tube or camera 6. In order to avoid errors in the measurement of transmission, the light leaving the separation chamber is filtered over the smallest possible spectral range through a thin layer filter 4. Thin layer filters with a half-value breadth of about 10 mm. have been found suitable for this.

The resistance image produced on the light-sensitive layer of the Vidicon screen is scanned by the cathode ray with time, so that an electric signal proportional to the light transmission is produced which indicates the temporal sequence of the degrees of transmission of the points over which the cathode tube passes. The current or flux during the very rapid line return corresponds with a good degree of approximation to dark current and can be taken as a zero point of the transmission scale which is divided into 100 percent.

After amplification with the AC amplifier 7 the line return signal indicates the zero line in the circuit part 8. Following this, the logarithm of the signal is computed by the logarithmic amplifier 9 so that the course of extinction is obtained as a new signal.

Since the integral must be formed via the negative logarithm and for determining the concentration relationships the undetermined integral is sufficient, a zero line is again formed in the circuit part 10 before the integration, and this zero line corresponds with the potential of minimum extinction, i.e. that part of the signal which previously corresponded to 100 percent transmission. In order to prevent the line return courses from being integrated as extinction values, during the line return the circuit part 10 is scanned at zero by means of a scanning circuit 11 controlled by the line synchronizing signal. After the integration in the integrator 12 the integrator voltage is measured with a peak value indicator 14.

In order to make only a given part of the curve visible and to integrate the same, various means can be provided and steps be taken. In accordance with an advantageous embodiment of the invention this is insured by means of a scanning circuit 13 which supplies a pulse. This pulse scans the curve part to be integrated on the monitor 15 so as to be light and during its duration scans up the integrator. This pulse originates from a bistable multivibrator and corresponds to the time difference between the trailing edges of two pulses from suitable monostable multivibrators. The duration of these pulses, which are produced by the picture synchronizing signal, can be set by hand, both the initiation and also the duration of the output pulse of the circuit being changed.

In this manner it is possible to scan any section of the curve as may be desired so as to be light and, for example, to make the left-hand boundary overlap with the new right-hand boundary of the next curve section. Furthermore it is possible to avoid with this method having to seek out afresh the end point of a section.

The integral over the whole curve can, also by hand, be weighted to 100 percent, i.e. the full sweep of the peak voltage measuring device 14, so that integrals appear over any desired curve sections as a percentage indication on the linear scale of the peak voltage measuring device.

If a certain curve section is to be precisely aligned with a material component, it is desirable to eliminate the possibility of the alignment being influenced by the optical impression of the minima as integration limits. In accordance with a further advantageous form of the invention, therefore, the maxima and minima are determined as zero transitions using an operation amplifier connected as a differentiator forming part of an embodiment of the invention not shown in the drawing. In this manner in a further operation amplifier, operating in an "open" manner, pulses are formed which determine the integration time, i.e. the integration section. Auxiliary sections with particular time constants present an undesired switching forward to the next integration section. The switching forward is brought about by a timing means or clock, for example operating electronically. If the voltages are digitally measured, they can be printed out, the command for printing and for measuring being derived from the same clock or timing means. If for feeding-in the sample an analysis sample feed means is used, the latter can supply the actuating signal for initiating operation of the clock. Such an analysis sample feeding device makes possible a fully automatic operation with an unambiguous coordination between the sample and the result.

In order to avoid the necessity of computing percent values from the printed-out data, the weighting or standardization to 100 percent of the total integral can be automated by making use of a suitably designed integrator which is connected in circuit with the actual measuring integrator and compares its output voltage with a reference voltage corresponding to 100 percent. The difference in voltage is then used for setting via a regulating amplifier the gain of both integrators in such a manner that the output voltage of the particular integrator connected in parallel with the actual measuring integrator deviates as little as possible from the reference voltage. In this manner the output voltages of the actual measuring integrator appear as percentage values of the reference voltage. If the latter is for example 1 volt, then the output voltages are fractions of 1 volt.

In accordance with a further advantageous embodiment of the invention for particularly accurate measurements use is made of Gauss distribution curves with a limited number, produced electronically, which are displayed with a second voltage in a time transducer on the monitor 15 and in accordance with the position breadth and height are adjusted until their sum curve covers the natural extinction curve corresponding to the distribution pattern. Following this each electronic Gauss curve can be integrated separately.

The production of the Gauss curve is carried out by wobbling a high frequency generator with the image saw tooth of the monitor 15. If the high frequency voltage is fed to resonance circuits whose coupling, quality and resonance frequency can be adjusted, the high frequency voltage is in accordance with bell curves whose height, breadth and position on the monitor image can be changed. After rectification of the high frequency voltage the envelope curve is obtained which is supplied to the voltage in a time converter.

In order to be able to monitor the optical adjustment of the light source, the distribution pattern and, possibly, the camera, the Vidicon signal is also used to project the Vidicon screen picture on a monitor 15.

A suitable voltage time converter 16 also makes it possible to use the monitor as an oscillograph, on which the transmission, extinction or integral curves are displayed.

The "voltage time converter" 16 employed consists of a monostable multivibrator whose pulses are derived from the time synchronizing signal. The pulse duration is dependent upon the operating voltage. This dependency is linear when the charging current of the capacitor determining the time constant is held constant, this being carried out by means of a transistor whose collector-emitter path is to be regarded as an infinitely great differential resistance.

The operating voltage is controlled by an amplifier so as to be proportional to the voltage to be formed. In this manner a linear relationship or dependency is established between the control voltage and the pulse duration.

The trailing edge of each pulse is used for keying the monitor 15 so as to be white. As a result on each line of the monitor image a bright point appears whose distance from the beginning of the line corresponds to the instantaneous operational voltage applied to the multivibrator or to the control voltage. In this manner a trait of the curve is produced which corresponds to the characteristic of the control voltage.

The curve displayed on the monitor 15 can be stored in a conventional manner as permanent documents. For this purpose use can be made of suitable picture recording means, for example making use of a camera of the "Polaroid"-type (Polaroid is a registered trademark) connected with the oscillograph.

With the invention it is possible to carry out screening of biological liquids and other mixtures of substances in any desired wavelength range with the help of Vidicon tubes of suitable sensitivity in a rapid and automatic manner. Thus, it is possible, for example with the aid of electrophoresis apparatus as described in principle in the British Pat. No. 1,098,307, to separate mixtures of material which pass through the separating chamber in approximately 2 minutes. Since the evaluation in accordance with the method of the invention lasts just as long it is in principle possible to investigate one mixture of substances every 4 minutes, for example in the case of sera samples, monochromatic UV-light being projected through the separation chamber and scanning being carried out with a UV-sensitive Vidicon tube in the manner described. In accordance with preferred embodiments of the invention, in the case of which automatic integration of the individual curves is carried out and the percentage data is printed out completely automatically, the investigation or screening times can be still further reduced.

What is claimed is:

1. In a method for the automated electronic densitometric evaluation of separated material mixtures using carrierless electrophoresis, wherein the distribution pattern of the light-absorbing or -reflecting mixture components is scanned in accordance with the flying point principle, the scanned points are converted into current pulses and the current pulses belonging to the scanned line are integrated, the improvement which comprises:

1. projecting light onto a section of an electrophoresis separation chamber and the separated mixture component contained therein to produce a distribution pattern represented by the light transmitted through said chamber;

2. projecting said distribution pattern through an optical system to produce a resistance image on the screen of an electronic television recording tube;

3. scanning said resistance image line by line by cathode ray means to obtain an electric signal representing the degree of light transmission;
4. amplifying said signal and forming the zero line for the degree of transmission;
5. deriving the logarithm of the amplified signal and reversing the phase of the logarithmic signal to form the null line of the extinction coefficient and to obtain a voltage;
6. scanning out the line return voltage and submitting said voltage to an integrator; and
7. measuring the integrator voltage using peak voltage measuring means.

2. The method according to claim 1 wherein the distribution pattern of the amplified electric signal is reproduced on a monitor.

3. The method according to claim 2 wherein the reproduced distribution pattern is photographically recorded.

4. The method according to claim 1 wherein a transmission, extinction or integral curve is displayed oscillographically on a monitor through a voltage time converter.

5. The method according to claim 4 wherein the displayed curve is photographically recorded.

6. The method according to claim 1 including the further steps of providing a reference voltage for comparison with the integrator voltage for the entire distribution pattern, using the voltage difference so obtained to set an integration amplifier to supply an output voltage weighted to 100 percent, and providing a parallel ganged integrator to integrate the voltages of selected curve sections of said distribution pattern in percent values.

7. The method according to claim 6 wherein the distribution pattern of the amplified electric signal is reproduced on a monitor and wherein the curve sections of said distribution pattern to be integrated are preselected so that the ranges of the distribution pattern lying outside the integrated curve sections appear dark on the monitor and are cancelled in the integrator.

8. The method according to claim 6 wherein the integrated curve sections provide cancelling pulses at the maxima and minima of the extinction curve.

9. The method according to claim 6 wherein the distribution pattern to be integrated is displayed on a monitor, an artificial Gauss distribution curve is collated to form a curve alignment therewith, and integration of the selected curve sections is carried out on the artificial Gauss distribution curve.

10. The method according to claim 6 including the further step of automatically printing out said percent values.

11. The method according to claim 10 wherein said automatic printing out is controlled by a timing means actuated by means feeding the separated mixture component into the electrophoresis separation chamber.

* * * * *